2 Sheets--Sheet 1.

J. MEISSE.
Machines for Polishing Glass and Stone.

No. 149,501. Patented April 7, 1874.

WITNESSES.
Henry N. Miller
C. L. Everts

INVENTOR
Joseph Meisse.
Alexander Mason
By
Attorneys.

2 Sheets--Sheet 2.

J. MEISSE.
Machines for Polishing Glass and Stone.

No. 149,501. Patented April 7, 1874.

WITNESSES.
Henry N. Miller
C. L. Everts

INVENTOR
Joseph Meisse.
Alexander Maton
By
Attorneys.

AM. PHOTO-LITHOGRAPHIC Co. N.Y. (OSBORNE'S PROCESS.)

UNITED STATES PATENT OFFICE.

JOSEPH MEISSE, OF NEW ALBANY, INDIANA.

IMPROVEMENT IN MACHINES FOR POLISHING GLASS AND STONE.

Specification forming part of Letters Patent No. 149,501, dated April 7, 1874; application filed November 26, 1873.

*To all whom it may concern:*

Be it known that I, JOSEPH MEISSE, of New Albany, in the county of Floyd and State of Indiana, have invented certain new and useful Improvements in Machines for Grinding Plate-Glass and Stone; and I do hereby declare the following to be a full, clear, and exact description thereof, reference being had to the accompanying drawings and to the letters of reference marked thereon.

The nature of my invention consists in the construction and arrangement of a machine for grinding plate-glass and stone, as will be hereinafter more fully set forth.

In order to enable others skilled in the art to which my invention appertains to make and use the same, I will now proceed to describe its construction and operation, referring to the annexed drawings, in which—

Figure 1:
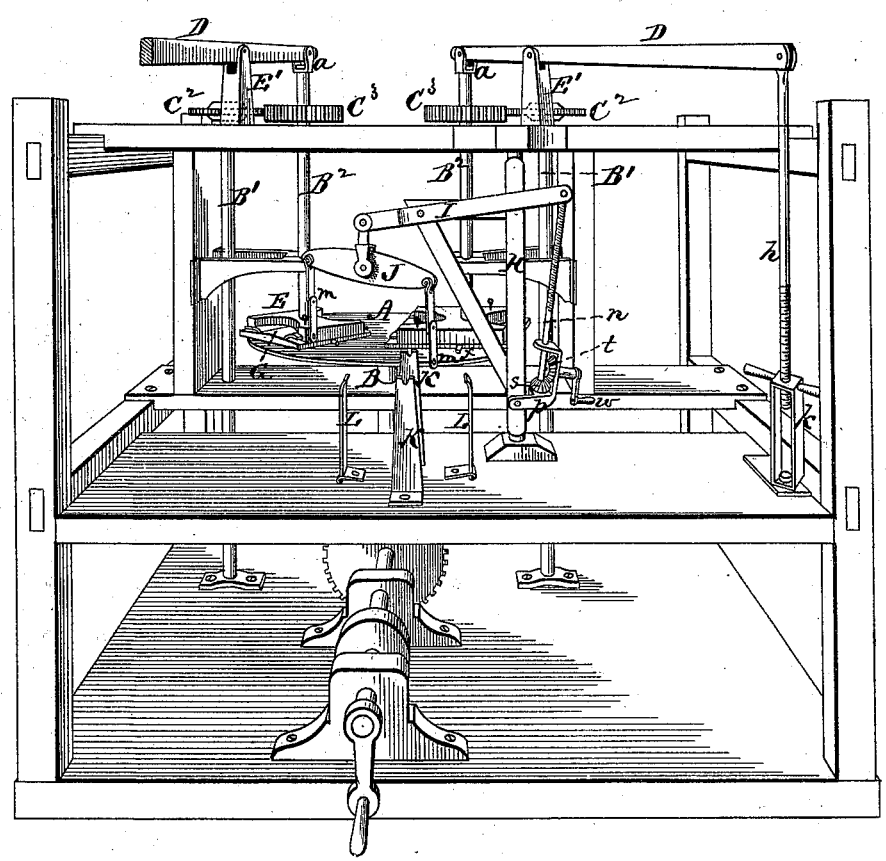
Figure 3:
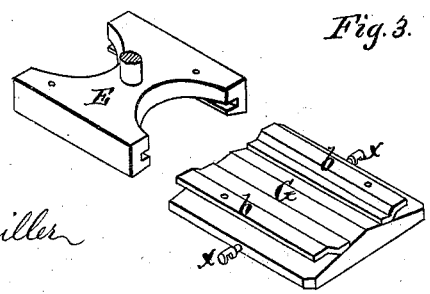
Figure 2:
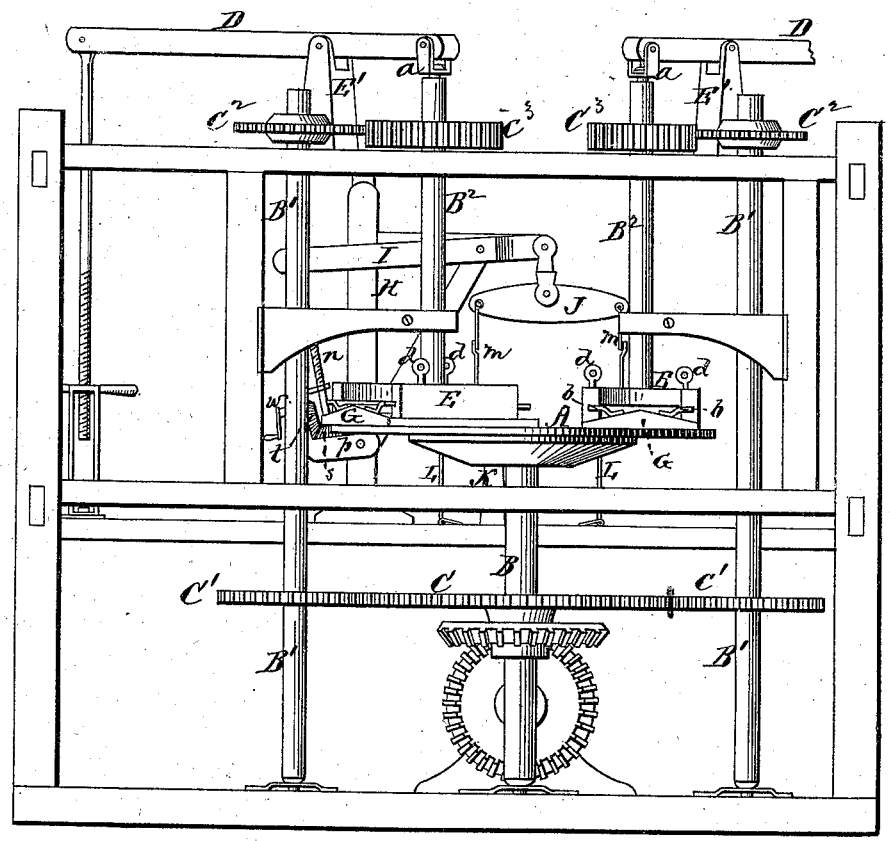
Figure 4:
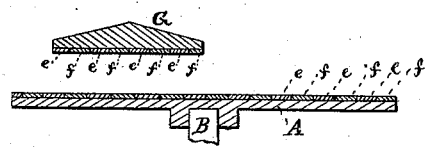

Figure 1 is a perspective view of the framework of a room or building with my machine located therein. Fig. 2 is a side elevation of the same. Fig. 3 is an enlarged perspective view, showing one of the grinding-plates and its holder; and Fig. 4 is a section, showing the construction of the platform and grinding-plates.

A represents a platform, of any suitable dimensions, resting upon a large or main upright shaft, B, in the center, to which the platform is secured in any desired manner, so as to revolve with the same. On the shaft B is secured a large cog-wheel, C, which gears with two smaller cog-wheels, $C^1 C^1$, attached to other two upright shafts, $B^1 B^1$. Upon the upper ends of these shafts $B^1 B^1$ are attached other cog-wheels $C^2 C^2$, which gear with cog-wheels $C^3 C^3$ upon shafts $B^2 B^2$, and thus impart motion to the same. The machine is operated by an engine, connected by suitable gearing with the main shaft B. The shafts $B^2 B^2$ are suspended each in a stirrup, $a$, hinged or pivoted on or at the end of a lever, D, which is pivoted in the upper forked end of a suitable standard, E', and the shafts pass through suitable guides, so as to be retained in a vertical position. To the lower end of each shaft $B^2$ is attached a plate-holder, E, grooved, as shown in Fig. 3, in which slide flanges $b b$, formed on or attached to the upper surface of the grinding-plate G, the plate being then held in the holder by means of pins $d d$. The platform A and plates G G are made in sections, of cast-iron, and screwed together. The bottom of the platform may be cast with openings, so as to reduce the weight. The upper surface of the platform and the lower surfaces of the grinding-plates are entirely covered with alternate strips of iron $e e$ and strips of wood $f f$, about two inches wide, more or less, secured by screws or other suitable means, so as to make a perfectly smooth surface. The levers D D at the top have their free ends forked or slotted, and in each is pivoted a rod, $h$, the lower end of which is provided with screw-threads for a suitable distance upward. This screw end of each rod $h$ screws into a nut in the upper end of a swiveled frame, $k$, arranged on the floor of the room in which the machine is placed. By turning the frame $k$ upon its swivel or pivot, by means of suitable handles attached to or formed on it, the lever D is turned on its pivot, so as to raise the shaft $B^2$, with the plate-holder E attached to it, when glass is put on and taken off. In front of the platform A is arranged a derrick, H, to the horizontal arm of which are pivoted two bars, I I, which are united at their front ends, and from the same is suspended a scale-beam, J, having hinged pendants $m m$ attached to its ends. Between the rear ends of the bars I I is pivoted a nut, through which passes a screw-shaft, $n$. The lower end of this shaft is held in a suitable frame, $p$, attached to the lower part of the derrick, and to said shaft is attached a bevel or miter pinion, $s$, which is operated by a similar cog-wheel, $t$, turned by a crank, $w$. This derrick, with its attachments, is used in taking off and replacing the grinding-plates, and may also be used in removing the platform when not too large.

To work the machine, place plaster on the surface of the platform, and lay the plate-glass or stone upon the same. The plates G G are then taken out, one at a time, by the use of the derrick and scale-beam attached thereto, the pendants $m m$ hooking on notched pins $x x$ in the sides of the plates. The plate-fasteners $d d$ are pulled out, after which the plate is pulled out, the derrick swung around, and the plate laid with the pins $x x$ in two notched uprights, K K, in front of the platform. The plate is swung around so as to bring the smooth surface up, after which the plate is steadied by two hinged side props, L L. The plates are then covered with plaster and glass, the same as the platform, and then returned to the plate-holder, and the shaft $B^2$ lowered, when the machine is ready for grinding.

If the platform is fifteen feet in diameter, or less, one plate is sufficient to grind; but if larger, then two plates are required, a large one and a smaller one. One is larger than the other, in order to grind the glass or stone alike at the outside of the platform, as well as on or near the center thereof.

If an extraordinarily large platform is required, the shaft B ought to run through it, and extend about five feet above it, and there fastened; and in this case two plates will be used of equal size, but the glass or stone must not be laid against the shaft at the center of the platform, but must be kept away from the center a sufficient distance to be covered by the plates when they revolve.

At the bottom of a very large platform should be guides or rods running to the shaft, and there fastened, in order to balance and steady the platform or table.

The grinding-plates G G should at first be let down easy and gradually, as glass and stone are usually rough at the edges. After these rough edges are taken off the plates may be let down fully, which prevents a great amount of breakage.

This machine makes entirely smooth glass or stone, and equally thick.

Having thus fully described my invention, what I claim as new, and desire to secure by Letters Patent, is—

1. The grinding-plate G, provided with flanges $b$ $b$ and notched pins $x$ $x$, and held in the grooved plate-holder by means of the pins $d$ $d$, substantially as and for the purposes herein set forth.

2. The combination of the plate-holder E, revolving shaft $B^2$, stirrup $a$, lever D, screw-rod $h$, and swiveled or pivoted frame $k$, all constructed substantially as and for the purposes herein set forth.

3. The combination, with the derrick H, of the pivoted bars I I, scale-beam J, with pendants $m$ $m$, and the screw-rod $n$, with gearing $s$ $t$ $w$, all constructed substantially as and for the purposes herein set forth.

4. The supports K K and hinged props L L, arranged substantially as and for the purposes herein set forth.

In testimony that I claim the foregoing I have hereunto set my hand in the presence of witnesses this 16th day of October, 1873.

JOSEPH MEISSE.

Witnesses:
JACOB HERTER,
JOHN L. ROBELLAZ.